United States Patent
Rahmani et al.

(10) Patent No.: US 10,366,399 B1
(45) Date of Patent: Jul. 30, 2019

(54) DETECTING ITEM TRENDS

(75) Inventors: Rouhollah Rahmani, Redmond, WA (US); Srikanth Thirumalai, Clyde Hill, WA (US); Elmore Eugene Pope, Sammamish, WA (US); Michael P. Touloumtzis, Brookline, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 605 days.

(21) Appl. No.: 13/421,607

(22) Filed: Mar. 15, 2012

(51) Int. Cl.
  *G06Q 10/04* (2012.01)
  *G06Q 30/02* (2012.01)
  *G06Q 10/00* (2012.01)

(52) U.S. Cl.
  CPC ......... *G06Q 30/0202* (2013.01); *G06Q 10/00* (2013.01); *G06Q 10/04* (2013.01)

(58) Field of Classification Search
  CPC ............... G06Q 30/0202; G06Q 30/02; G06Q 30/0201; G06Q 10/00
  USPC ............................................ 705/11–42, 7.31
  See application file for complete search history.

(56) References Cited

U.S. PATENT DOCUMENTS

| | | | | |
|---|---|---|---|---|
| 6,041,311 A * | 3/2000 | Chislenko et al. | .......... | 705/26.7 |
| 7,155,510 B1 * | 12/2006 | Kaplan | .............. | G06Q 30/0202 705/7.31 |
| 7,366,721 B1 * | 4/2008 | Bennett | ............. | G06F 17/30873 707/959 |
| 7,536,322 B1 * | 5/2009 | Selinger | .............. | G06F 17/3053 705/26.5 |
| 7,783,622 B1 * | 8/2010 | Vandermolen | .... | G06F 17/30867 707/708 |
| 2006/0143069 A1 * | 6/2006 | Graves et al. | ................... | 705/10 |
| 2008/0005751 A1 * | 1/2008 | Chandra | ........... | G06F 17/30896 719/328 |
| 2009/0319342 A1 * | 12/2009 | Shilman | ............ | G06F 17/30864 705/7.41 |

OTHER PUBLICATIONS

Sharon Q. Yang Kurt Wagner, (2010),"Evaluating and comparing discovery tools: how close are we towards next generation catalog?", Library Hi Tech, vol. 28 Iss 4 pp. 690-709 (Year: 2010).*

* cited by examiner

*Primary Examiner* — Hafiz A Kassim
*Assistant Examiner* — Zahra Elkassabgi
(74) *Attorney, Agent, or Firm* — Thomas Horstemeyer, LLP

(57) ABSTRACT

Disclosed are various embodiments for identifying items that may achieve success and/or popularity. An approval user interface element can be associated with an item in a content page. Approval indications that correspond to user interactions with the approval user interface elements are obtained. An item score is maintained and adjusted based at least upon the approval indications received. The adjustment to the item score is based upon a number of received approval indications and/or a reputation score of users to which the approval indications correspond.

21 Claims, 7 Drawing Sheets

US 10,366,399 B1

DETECTING ITEM TRENDS

BACKGROUND

Items, such as products available via an electronic commerce system, can become popular with little warning. It can be difficult to predict which items achieve popularity or success before the items actually achieve popularity or success. Prediction of item trends that consider backward looking sales metrics can result in detection of trends associated with an item later than is desired.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the disclosure are directed to identifying concepts and/or products available via an electronic commerce system that have the potential to be popular. Embodiments of the disclosure can attempt to predict the popularity of product and/or concepts before the product and/or concept actually achieves popularity. In other words, embodiments of the disclosure can detect trends related to various products and/or concepts. In one embodiment, an approval user interface element can be placed alongside various types of content pages provided by various sites through which users can express an interest in or approval of an item shown on the page. The concept and/or product associated with the page can be identified and a score calculated that represents whether the concept and/or product is likely to achieve popularity. Such a score can be based upon, among other things, a reputation of the users expressing approval of the concept and/or product, where the reputation is reflective of a historical ability of a users' success rate in identifying concepts and/or ideas that are likely to achieve popularity prior to the concept and/or idea actually achieving popularity.

Figure 1:
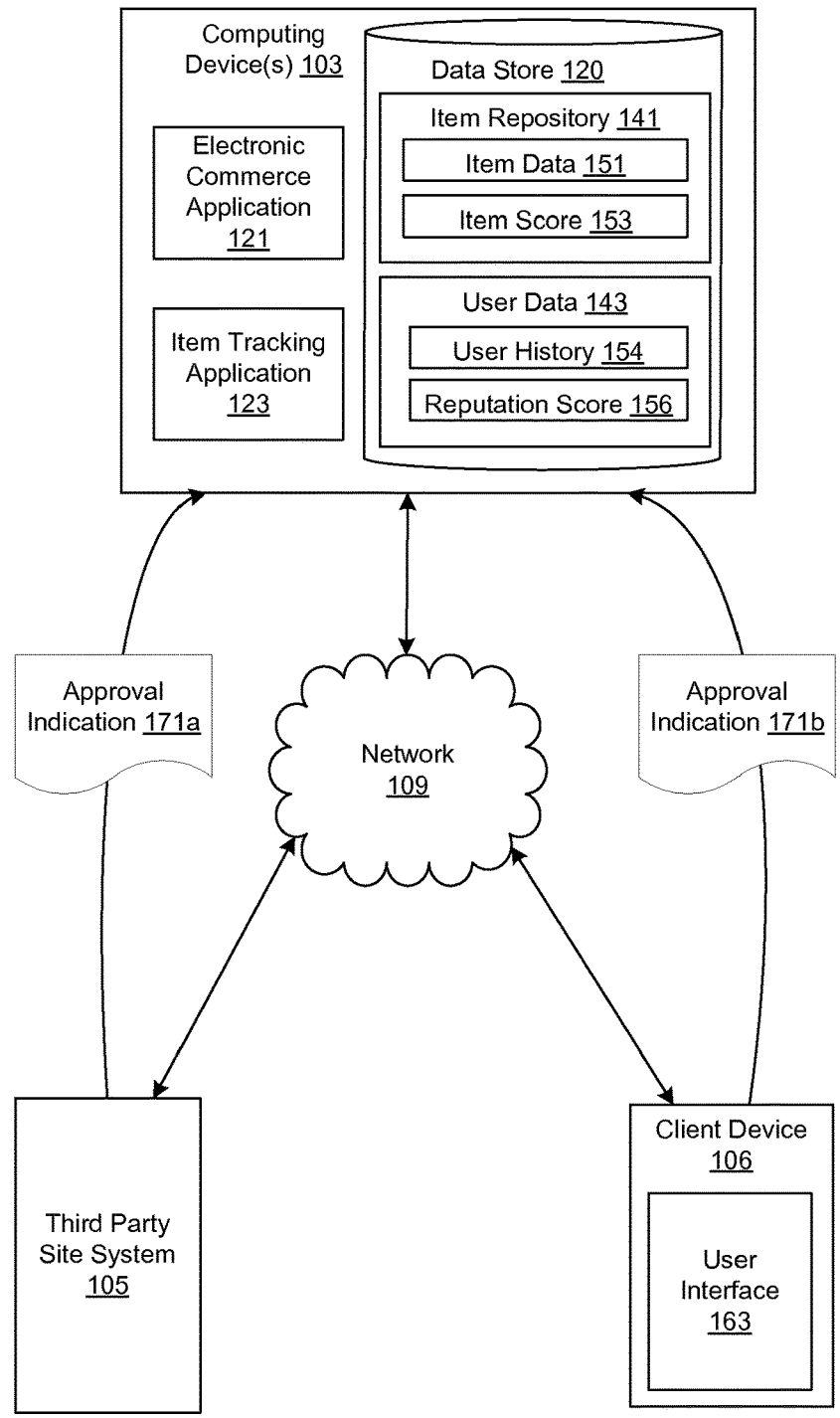
FIG. 1 is a drawing of a networked environment in which an item tracking application according to one embodiment of the disclosure can be implemented.

Reference is first made to FIG. 1, which depicts a networked environment 100 in which one example of a system according to an embodiment of the disclosure can be implemented. It should be appreciated that embodiments of the disclosure can be implemented in various alternative configurations and that the depicted environment is only one example. The networked environment 100 includes at least one computing device 103 that is in communication with at least one third party site system 105 and at least one client 106 over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above. Likewise, the at least one third party site system 105 can also be implemented in a computing device as described above.

Various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below.

The components executed on the computing device 103, for example, include an electronic commerce application 121, an item tracking application 123 and other applications, services, processes, systems, engines, or functionality not discussed in detail herein. The electronic commerce application 121 is executed in order to facilitate the viewing and/or purchasing of items and products over the network 109. Accordingly, the electronic commerce application 121 can allow a seller to set pricing for the various items and products as well as process payments submitted or authorized by users to make purchases. The electronic commerce application 121 can direct the shipment and/or delivery of products to a customer from a fulfillment center or the like. In some embodiments, the electronic commerce application 121 can process an order from a user on a client 106 and transmit order details to a seller for fulfillment of the order.

To this end, the electronic commerce application 121 can facilitate an electronic marketplace in which users can access products made available by sellers on various pricing, payment, and/or shipment terms. A user can browse various products available from various sellers via the electronic commerce application 121, and add products to a virtual shopping cart for later purchase. Various products in a virtual shopping cart can be fulfilled by various sellers and have various shipping terms and prices. The electronic commerce application 121 can access these various products from a product catalog that can be available in the data store 120 or other system in communication with the electronic commerce application 121. The electronic commerce application 121 can, in one embodiment, process payment for products in a virtual shopping cart and forward payment to the various sellers associated with the items purchased by the user. The electronic commerce application 121 also performs various backend functions associated with the online presence of a merchant in order to facilitate the online purchase of items by users in such a marketplace.

For example, the electronic commerce application 121 generates network pages, such as web pages or other types of network content, that are provided to client devices 106 in response to requests for the purposes of selecting items for purchase and to perform other tasks as will be described. In other embodiments, the electronic commerce application 121 facilitates the generating of data for display on a user interface rendered by another type of application executed on a client device 106. The electronic commerce application 121 can also include other functionality for facilitating online shopping, which is not discussed in detail herein.

The item tracking application 123 can obtain approval indications from various sources that correspond to expressions of interest in a concept and/or product that is associated with a content page. In some scenarios, an approval user interface element can be placed in a content page and be linked to a specific product available via an electronic commerce system. Accordingly, if a user selects an approval user interface element placed on the content page, the item tracking application 123 can associate a "vote" for the product that is based upon the reputation of the user. The item tracking application 123 can then calculate an item score corresponding to the product that is based upon a number of votes corresponding to an item as well as on the reputation of the users associated with the votes. The reputation of a user can include a historical ability of a user at identifying products and/or concepts and achieve popularity, but doing so before other users and/or before the product and/or concept becomes popular.

Additionally, in some scenarios, an approval user interface element can be placed in a content page and not be specifically linked to a product available via an electronic commerce system. In this scenario, the item tracking application 123 can identify one or more concepts that are embodied in the content page, identify concepts of interest in the page based upon a corpus of user expressions of interest in the content page, and then link the vote of a user with a specific product and/or features of a product.

In an additional scenario, an approval indication can also include a portion of a content page that is selected by the user and submitted along with the approval indication. In this scenario, the item tracking application 123 can identify a product and/or product feature from the subset of the content page in which the user expresses approval by determining whether the selected portion of the page can be associated with a product available via an electronic commerce system.

The data stored in the data store 120 includes, for example, an item repository 141, user data 143 and potentially other data. In the context of the present disclosure, an item can represent a product available via an electronic commerce system and/or some concept or item that may not be available via an electronic commerce system, but for which the item tracking application 123 can track to determine whether the concept achieves popularity. Therefore, in some embodiments, the item repository 141 includes, for example item data 151, which can comprise information about products that are available via an electronic commerce system or that may be available in the future. For example, the item data can include product imagery, videos, descriptions, keywords, or other information about a product. Additionally, the item data 151 can include one or more product identifiers with which products in the item repository 141 can be uniquely identified within the item repository 141. As one example, the item data 151 can also include a product serial number, stock keeping unit, a globally unique identifier, or any other information with which a product can be identified.

As another example, an item can represent a feature and/or attribute that can correspond to many products. Accordingly, in this example, the item data 151 represents data that identifies the feature and/or attribute. An item can also represent any other concept in which users have expressed an interest via an approval indication by selecting an approval user interface element. In this scenario, even though the item may not represent a specific product that is available via an electronic commerce system, the item may represent some concept in which users may express an interest. Therefore, the item tracking application 123 can identify whether a particular concept of interest is achieving popularity even when it may not represent a product that can be sold via the electronic commerce application 121.

Each item is also associated with an item score 153. The item score 153 represents a score that corresponds to whether an item is achieving or on the verge of achieving popularity. For example, for a product available from an electronic commerce system that possesses desirable features but which may not yet be popular, users can express approval of the product, and if a threshold number of these users are associated with a good historical reputation for identifying popular products, the product can be highly scored. Other examples of the scoring of an item are discussed hereinbelow.

User data 143 comprises data corresponding to users from whom approval indications 171 corresponding to an interaction with approval user interface elements are received. The user history 154 represents historical interactions of a user with approval user interface elements that may correspond to various types of items. For example, the user history 154 can include a reference to the various products and/or content pages with which approval user interface elements are associated and that the user has selected. The user data 143 also includes a reputation score 156 associated with each user. A reputation score 156 represents an indication of a historical success rate of a user in identifying items that achieve popularity, critical acclaim, or other type of validation. The reputation score 156 is also a measure of whether a user's ability to identify items that achieve popularity before the item actually achieves popularity or before a threshold number of other users express approval of the item. In other words, users with a high reputation score 156 are those that identify items achieving popularity before other users do so.

The depicted table structure of the data store 120 is one example of how data can be structured therein according to embodiments of this disclosure, as it should be appreciated that data can be structured in many different ways across multiple data stores implemented in various computing devices. Data can be extracted by the item tracking 123 and/or electronic commerce application 121 by performing queries against data stored in the data store in wholly different table structures. In various embodiments, the data store 120 may comprise a relational or non-relational database, or any other type of system from which data can be retrieved. Accordingly, it should be appreciated that the depicted data store 120 and the table structure shown therein is but one example given for ease of depiction and explanation of the various embodiments of this disclosure.

Likewise, it should also be appreciated that the particular depiction of an electronic commerce application 121, an item tracking application 123 executed in one or more computing devices 103 is but one example of an environment in which an embodiment of the disclosure can be implemented. It should be appreciated that an implementation according to an embodiment of the disclosure can be implemented in various ways, with the functionality described herein implemented in various application structures.

The third party site system 105 is representative of one or more computing devices in which a third party site can be implemented. As noted above, a third party site can include any type of site that delivers content pages to clients in which an approval user interface element can be placed. An approval user interface element, as will be shown in the following drawings, can comprise a button, hyperlink, or any other type of user interface element that can be rendered by a client device. As one example, a third party site 105 can place an approval user interface element in a user interface transmitted to a client 106. When a user interacts with the approval user interface element, an approval indication 171 can be transmitted from a client 106 and/or relayed from the third party site system 105 to the item tracking application 123.

The client 106 is representative of a plurality of client devices that may be coupled to the network 109. The client 106 may comprise, for example, a processor-based system such as a computer system and/or mobile device. Such computer system may be embodied in the form of a desktop computer, a laptop computer, a personal digital assistant, a cellular telephone, set-top box, music players, web pads, tablet computer systems, game consoles, or other devices with like capability. The client 106 may be configured to execute various applications such as a browser and/or other applications. The browser may be executed in a client 106, for example, to access and render network pages, such as web pages, or other network content served up by the electronic commerce application 121, the third party site system 105 and/or other systems. A client 106 can also be configured to execute a special purpose application, such as a mobile application, which may include client side code that renders a user interface that includes data provided by another system. Although the specific implementation of a client 106 can vary, the client 106 is configured to render a user interface 163 generated by the computing device 103 and/or the third party site system 105 as described herein.

The user interface 163 generated by the computing device 103 and/or third party site system 105 can include a content page, such as a web page, or any user interface data that can be rendered on a client. As an alternative example, the computing device 103 and/or third party site system 105 can generate a user interface 163 that includes data that can be rendered with client side code executed in a client 106.

Certain components to facilitate embodiments of the disclosure may be implemented in one computing device 103, while other components may be implemented in a second computing device 103. The functionality discussed herein as occurring in one computing device 103 is but one example. For instance, a first computing device may execute software applications or components to facilitate tracking of approval indications from various users, and a second computing device may execute software applications or components to facilitate the receiving and processing of orders in an electronic commerce application 121.

Next, a general description of the operation of the various components of the networked environment 100 is provided. As noted above, embodiments of the disclosure can detect items that may be trending and/or on the verge of popularity, critical acclaim, or any other type of recognition. As one example, the item tracking application 123 can obtain approval indications 171 corresponding to expressions of approval from various users via clients 106 that correspond to a particular product available via an electronic commerce system. Approval indications 171 can include a reference to the content page as well as the user to which they correspond. These approval indications 171 can be received via an approval user interface element in a user interface 163 with which a user interacts on a client 106. In other words, the approval user interface element can comprise a button that a user can press to indicate an interest in the content. In some embodiments, an approval indication 171 can be received via a third party site system 105. In other words, when a user interacts with the approval user interface element, an approval indication 171 can be relayed through the third party site system 105 to the item tracking application 123.

As noted above, an approval user interface element, or approval button, can be placed in various content pages and can be bound to various types of content. For example, an approval button can be placed by a content author in a content page and specifically bound to a particular product that is available via an electronic commerce system. Such a content page can take the form of a review of the product, a product detail page provided by the electronic commerce application 121, an advertisement for the product, or any other type of content as can be appreciated. In such a scenario, when a user selects the approval button, the user interface 163 in which the button is placed can generate a corresponding approval indication 171 that is transmitted to item tracking application 123. Because in this case the approval user interface element is bound to a particular product, the item tracking application 123 can associate the approval indications 171 with an item in the data store 120 that corresponds to the product.

Accordingly, the item tracking application 123 can then adjust an item score 153 corresponding to the product based upon the reputation score 156 of the user that corresponds to the approval indication 171. As noted above, the reputation score 156 corresponds to a historical ability of a user in identifying items that achieve popularity as well as how early in time relative to other users a particular user expresses approval of an item. In other words, a thought leader in a particular domain can have a high reputation score 156 if the user exhibits an ability to identify popular and/or critically acclaimed items in a timely fashion. In this sense, timeliness can be gauged in terms of when a user indicates approval in an item relative to other users. Therefore, if a first user indicates approval of an item earlier in time than a second user, the first user has indicated approval of the item in a more timely fashion. Therefore, the higher the reputation score 156 of a user to whom an approval indication 171 corresponds, the more positive adjustment to the item score 153 made by the item tracking application 123.

In some applications of an approval user interface element in a content page, the approval user interface element may not be bound to a particular product available via an electronic commerce system. For example, in some scenarios, the approval user interface element placed in a content page by a content author may simply be bound to the content page without an indication of a particular product or other item to which the approval button is bound. Therefore, in these scenarios, the item tracking application 123 identifies one or more concepts of interest to which the approval user interface element should be bound. In one embodiment, the item tracking application 123 can employ a machine learning algorithm that identifies a plurality of concepts that are embodied in a content page. The machine learning algorithm can then identify one or more concepts of interest in the content page. An approval indication 171 can then be bound to the one or more concept of interest.

In one embodiment, the item tracking application 123 can employ a multiple instance learning machine learning algorithm that identifies concepts of interest in a content page that satisfy an objective indicator with which the algorithm is configured. The multiple instance learning algorithm can operate on a corpus of approval indications 171 corresponding to the same content page that is received from other users and stored in the respective user histories 154 of the users. By analyzing this corpus of approval indications 171 corresponding to a user population, the multiple instance learning algorithm can identify a concept of interest that is prominent in the content page. The item tracking application 123 can then assume that the one or more concept of interest identified by the multiple instance learning algorithm should be associated with the approval indications 171 corresponding to the content page in which a corresponding approval user interface element is placed.

In this way, the item tracking application 123 can identify items that achieve popularity even though the approval user interface element placed in a content page by a content author is not specifically bound to a specific item associated with the content page. As an example, a content page may describe a recipe that includes various items that may correspond to products available via an electronic commerce system. Accordingly, the item tracking application 123 can identify one or more concepts of interest in such a page and associate approval indications 171 with the identified concepts of interest.

In some embodiments, an approval user interface element placed in a content page can allow a user to select a portion of the content page and generate an approval indication 171 that includes a reference to the selected portion of the content page. In this way, the user can select a specific portion of the content page in which he or she wishes to express an approval. For example, a user can select text, images, video and/or audio appearing in a content page and then cause an approval indication 171 to be generated and communicated to the item tracking application 123. Accordingly, the item tracking application 123 can identify concepts of interest in the selected portion of the content page by executing a machine learning algorithm as described above.

By employing the above methodologies of processing approval indications 171 caused by user interactions with approval user interface elements, the item tracking application 123 can identify items (e.g., products) that may be on the verge of popularity, critical acclaim, or any other form of validation. These items can be identified by examining the item score 153 associated with items relative to other items in the data store 120 and/or other items have the same or similar product category. The highest scored items can be identified as those that are on the verge of popularity or items that are trending. As an alternative example, an item associated an item score 153 that is increasing at a rapid rate relative to others can also be identified as such an item.

Therefore, as items can be identified as on the verge of popularity, critical acclaim, etc., the success of an item, in whatever form success can be measured for the item, is validated by the item tracking application 123 once a number of users expressing approval in the item reaches a critical mass, or a predefined threshold. For example, once a certain number of approval indications 171 corresponding to an item are obtained by the item tracking application 123, the item tracking application 123 can attempt to validate whether the item has met some objective measure of success. In the case of a product available via an electronic commerce system, such a measure can include a predefined threshold metric that is based upon one or more of a sales velocity, sales volume, profitability, or other sales related metrics.

In some cases, such as in the case of a work of art (e.g., film, television show, music), such a measure can include the tracking of awards given to the item or other measures of critical acclaim. In some embodiments, the item tracking application 123 can observe content from one or more trusted sources from which user reviews and/or professional reviews about an item can be extracted. The item tracking application 123 can then identify whether a sentiment expressed about a particular work of art is positive and/or negative. For example, the item tracking application 123 can include a sentiment analysis engine that extracts a sentiment from a text sample to determine whether a review of a work of art expresses a positive sentiment. If the sentiment is positive, the item tracking application 123 can record a positive vote corresponding to the work of art. The item tracking application 123 can repeat such a process across many reviews and determine whether a consensus can be determined regarding whether the work of art is positively or negatively reviewed by a population of reviewers.

Therefore, the item tracking application 123 can be configured to determine some measure of validation for each of the items. Upon validating the success of an item, the item tracking application 123 can adjust the reputation score 156 of the various users that generated an approval indication 171 corresponding to the item based upon whether the user's expression of approval in an item was correct or incorrect. For example, when a user presses an approval button and causes an approval indication 171 to be generated for a content page that is bound to an item such as a product available via an electronic commerce system, if the item tracking application 123 determines that a sales velocity, sales volume, or other metric does not exceed a predefined threshold, the reputation score 156 of the users voting for the item is decreased.

Alternatively, when a user presses an approval button and causes an approval indication 171 to be generated for an item whose success is eventually validated by the item tracking application 123, the item tracking application 123 can positively adjust the reputation score 156 of the user. Additionally, the amount by which the reputation score 156 of the user is adjusted can be based upon a degree of success and/or failure achieved by an item. Furthermore, the amount by which the reputation score 156 of the user is adjusted can also be based when a user generated an approval indication 171 corresponding to an item. For example, a user who earlier indicates approval for an item that is eventually successful receives a greater positive adjustment to reputation score 156 than a user who later indicates approval for the same item.

Figure 2:
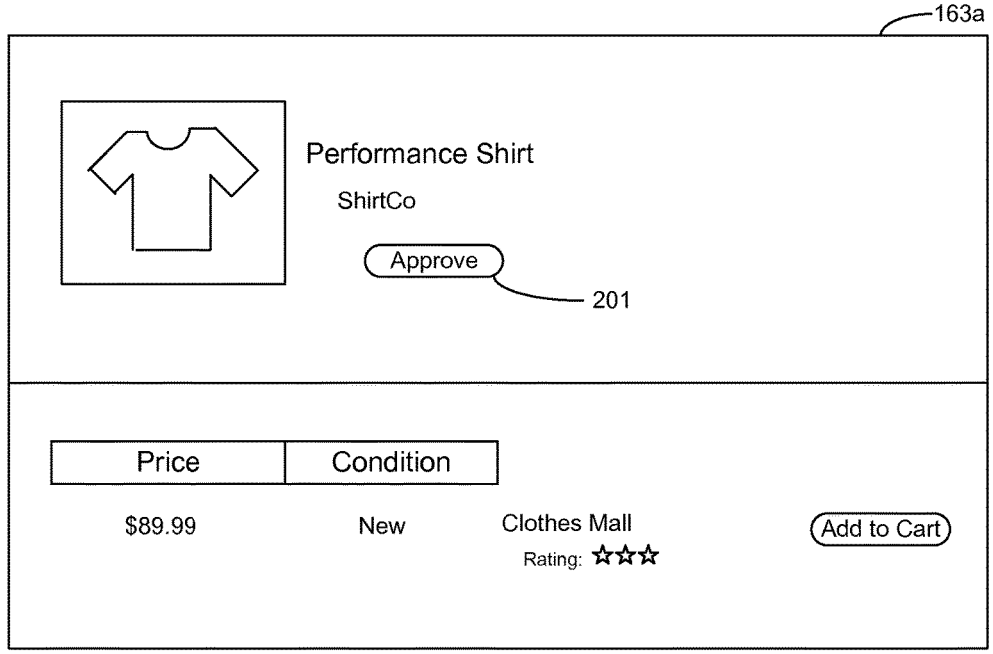
FIGS. 2, 3, 4, 5A and 5B are example user interfaces rendered in a client in the networked environment of FIG. 1 according to various embodiments of the present disclosure.

Reference is now made to FIG. 2, which illustrates one example of a user interface 163a that incorporates an approval user interface element 201 according to an embodiment of the disclosure. In the depicted example, the electronic commerce application 121 can generate a product detail page that incorporates an approval user interface element 201. The approval user interface element 201 is configured to generate an approval indication 171 corresponding to a user for whom the product detail page is generated when the user interacts with the approval user interface element 201. Therefore, in this example, the approval user interface element 201 can be bound to a specific product available via an electronic commerce system by the content author of the depicted product detail page. When a user selects the approval user interface element 201, an approval indication 171 is communicated to the item tracking application 123 and includes a reference to the content page and/or user. Accordingly, the item tracking application 123 can make an adjustment to a corresponding item score 153 based upon the reputation score 156 of the user.

Figure 3:
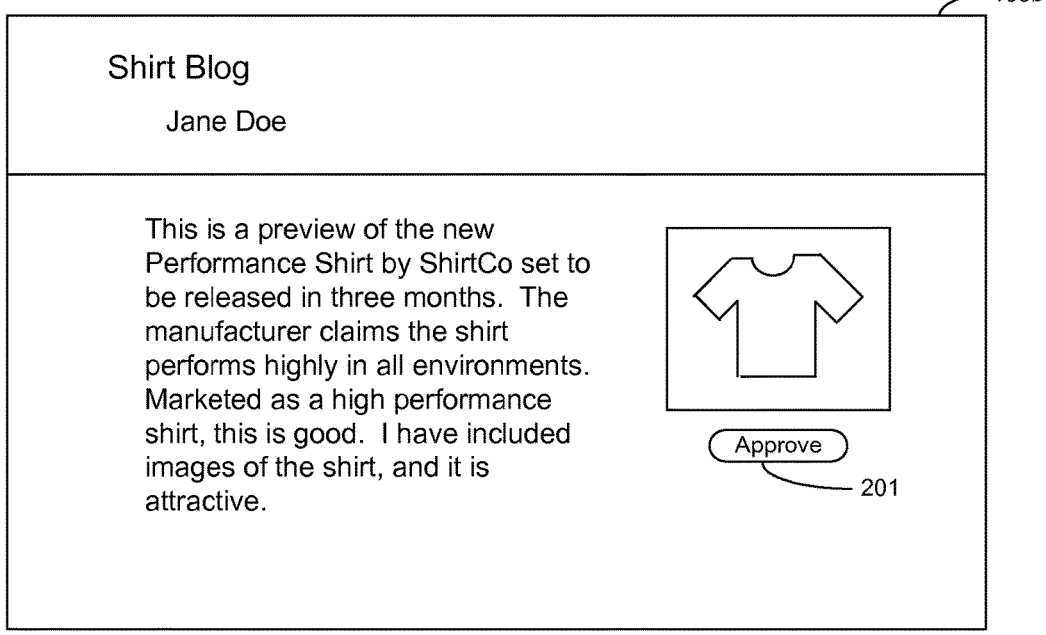
Figure 4:
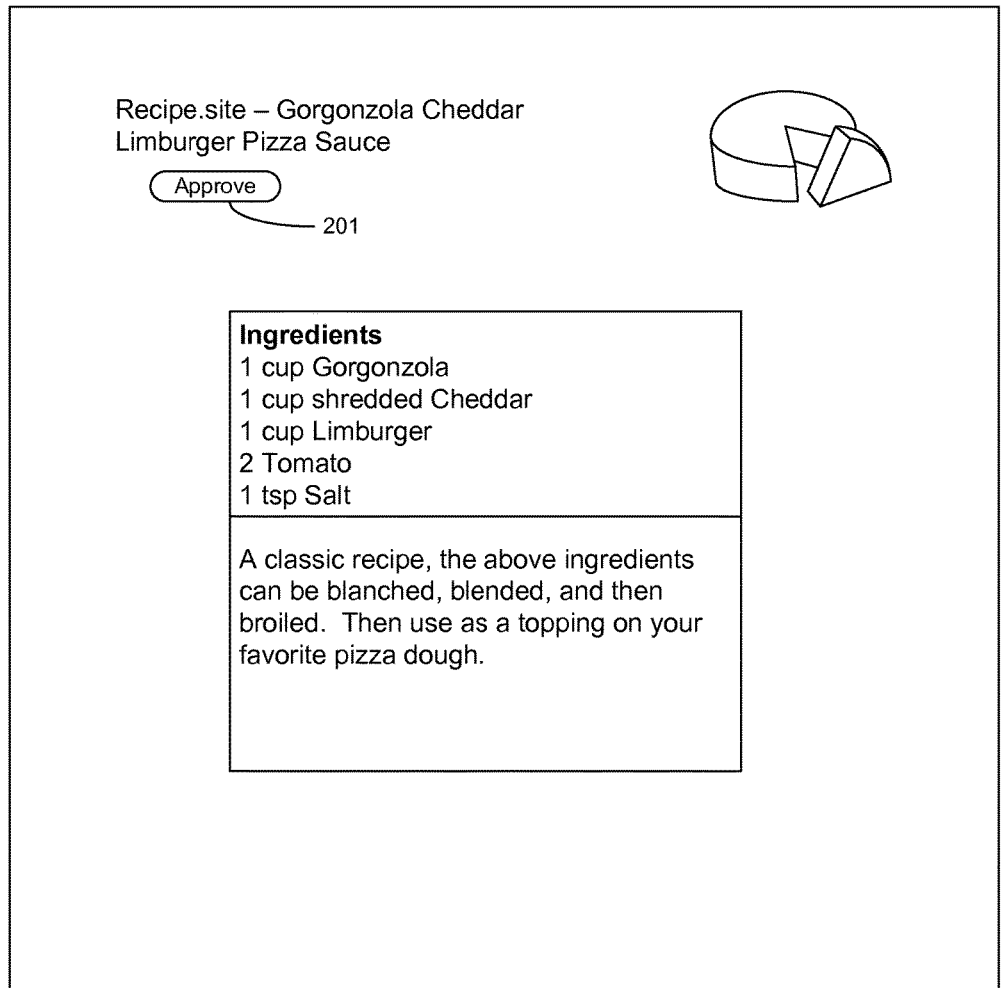

In FIG. 3, shown is an alternative example of a user interface 163b that includes an approval user interface element 201. In the example of FIG. 3, the content page may not be specifically bound to a corresponding product available via an electronic commerce system. Therefore, as noted above, the item tracking application 123 can employ a machine learning algorithm to identify concepts of interest from among the various concepts that can be extracted from the content page and associate an approval indication 171 originating from the user interface 163b with the identified concepts of interest. Similarly, FIG. 4 illustrates an example of a user interface 163c that incorporates an approval user interface element 201. In this example, the item tracking application 123 can execute, for example, a concept extractor to identify concepts embodied in the content page associated with the user interface 163c. The item tracking application 123 can then execute a multiple instance learning algorithm to identify concepts of interest from among the concepts identified in the content page associated with the user interface 163c. Then, the item tracking application 123 can determine whether the concepts of interest correspond to a product available via an electronic commerce system.

Figure 5A:
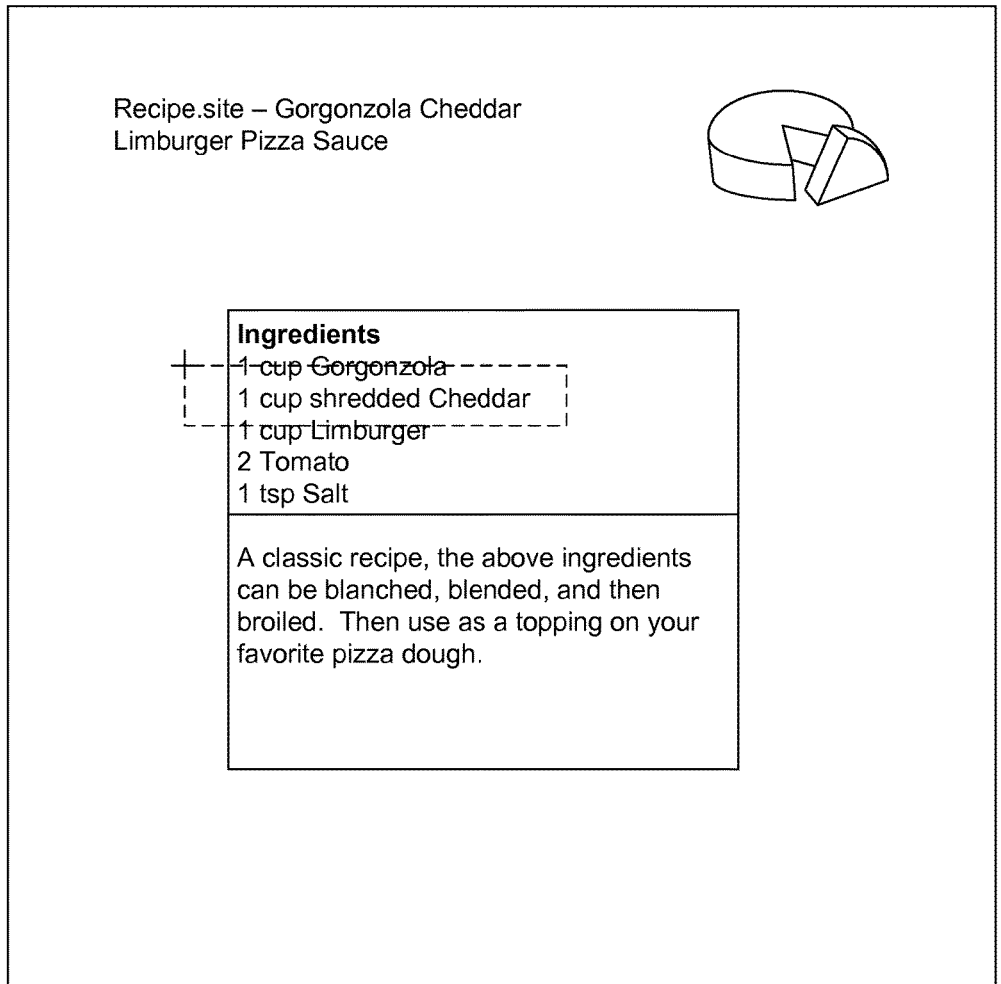
Figure 5B:
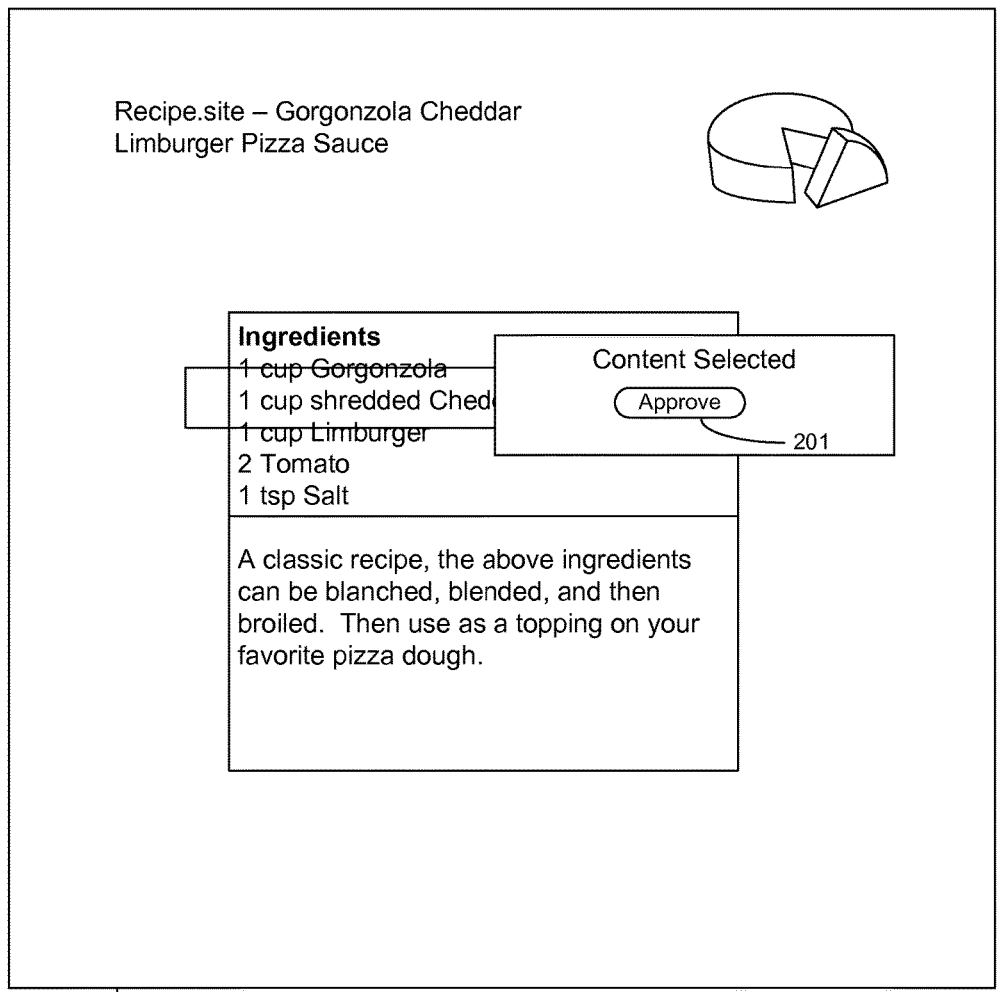

Referring next to FIGS. 5A-5B, shown is an alternative example of a user interface 163d that can incorporate an approval user interface element 201. In the depicted example, a user can select a portion of the content page and as shown in the FIG. 5B, the user can indicate approval of the selected portion of the content page. Accordingly, the item tracking application 123 can again employ a concept extractor as well as a machine learning algorithm to identify the concepts of interest in the selected portion of the content page and associate a corresponding approval indication 171 with the identified concepts of interest.

Figure 6:
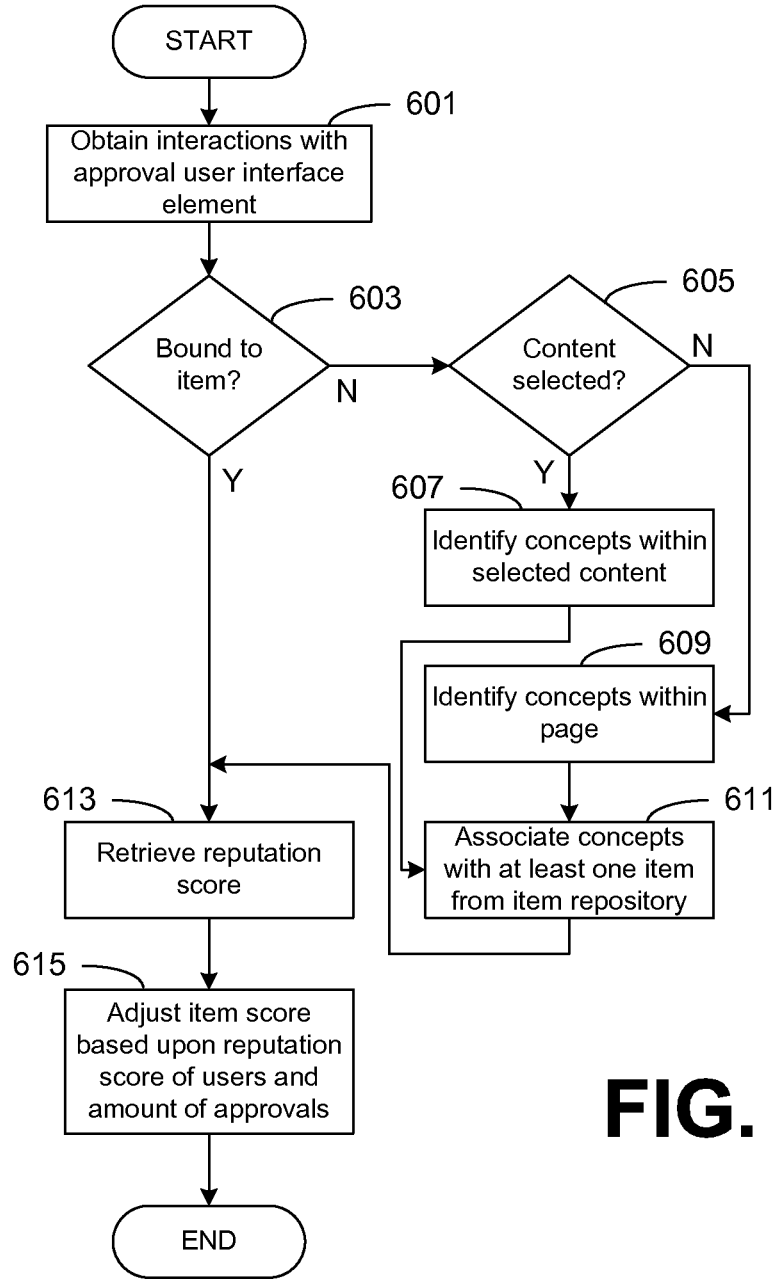
FIGS. 6-7 are flowcharts providing examples of the operation of the item tracking application of FIG. 1 according to an embodiment of the present disclosure.
Figure 7:
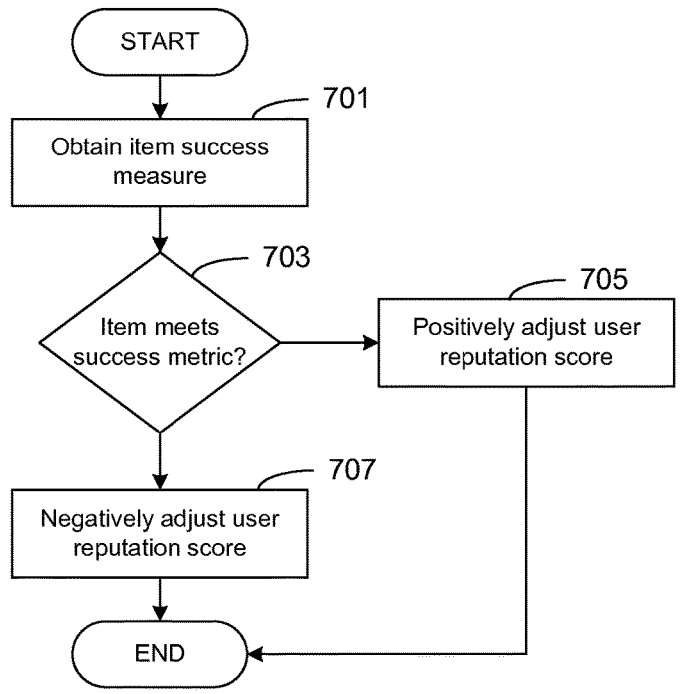

Turning now to FIGS. 6-7, shown are flowcharts that provides examples of the operation of a portion of the item tracking application 123 (FIG. 1) according to various embodiments. It is understood that the flowcharts of FIGS. 6-7 provide merely examples of the many different types of functional arrangements that may be employed to implement the operation of the portion of the item tracking application 123 as described herein. As an alternative, the flowcharts of FIGS. 6-7 may be viewed as depicting an example of steps of a method implemented in the computing device 103 (FIG. 1) according to one or more embodiments.

Beginning at box 601, the item tracking application 123 can obtain interactions of a user with an approval user interface element placed in a content page. In other words, the item tracking application 123 can obtain approval indications associated with the approval user interface element. In box 603, the item tracking application 123 determines whether the approval indication is bound to a particular item. For example, the item tracking application 123 determines whether the approval indication is bound to an item that is a product available via an electronic commerce system and associate the approval indication with the product. In box 605, the item tracking application 123 determines whether the approval indication is associated with content from the content page that is selected by the user.

If so, then in box 607 the item tracking application 123 identifies concepts of interest within the selected content. If not, then in box 609, the item tracking application 123 identifies concepts of interest within the content page. In box 611, the item tracking application associates the identifies concepts of interest with one or more items in the item repository. In box 613, the item tracking application 123 retrieves a reputation score associated with the user that corresponds to the approval indication. In box 615, the item tracking application 123 adjusts an item score corresponding to the item, whether the item is a concept and/or a specific product available via an electronic commerce system, based upon the reputation score of the user and a number of other approval indications associated with the item.

Referring next to FIG. 7, shown is an example of how the item tracking application 123 can adjust a reputation score of a user. In box 701, the item tracking application 123 obtains a measure indicating whether an item has achieved success. As described above, such as measure can include sales metrics, item reviews from a trusted source, or other indications as can be appreciated. In box 703, the item tracking application 123 determines whether the item meets the success metric. In box 705, the item tracking application 123 positively adjusts the reputation score if the item meets the success metric. In box 707, the item tracking application 123 negatively adjusts the reputation score if the item fails to meet the success metric. As noted above, the item tracking application 123 can also positively adjust a reputation score depending on the timeliness of the user's indication of approval of an item. Therefore, the earlier in time that a user indicates approval of a successful item, the greater the positive adjustment to a reputation score.

Figure 8:
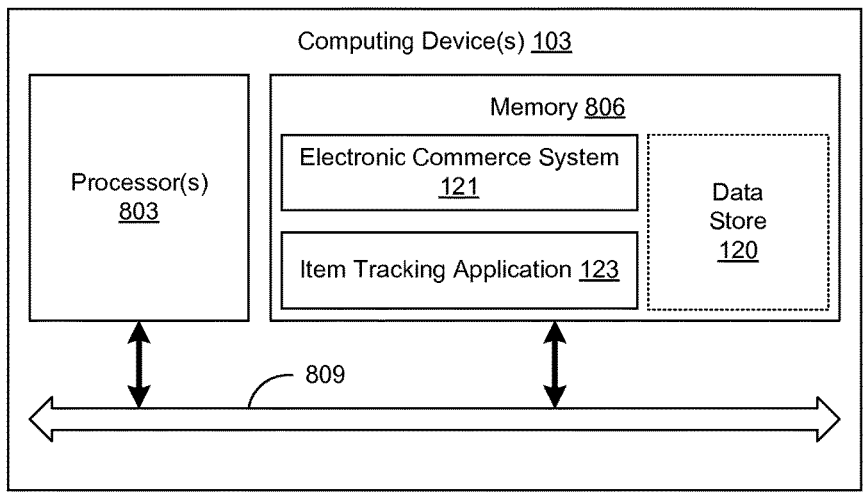
FIG. 8 is a block diagram of one example embodiment of a computing device in the networked environment of FIG. 1 according to various embodiments of the disclosure.

Moving on to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the electronic commerce application 121, item tracking application 123, and potentially other applications. Also stored in the memory 806 may be a data store 120 and other data. In addition, an operating system may be stored in the memory 806 and executable by the processor 803. While not illustrated, the client device 106 and/or third party site system 105 also includes components like those shown in FIG. 8.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803.

Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors and the memory 806 may represent multiple memories that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the item tracking application 123 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6-7 show the functionality and operation of an implementation of portions of the item tracking application 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6-7 show a specific order of execution, it is understood that the order of execution may differ from that which is depicted. For example, the order of execution of two or more blocks may be scrambled relative to the order shown. Also, two or more blocks shown in succession in flowcharts of FIGS. 6-7 may be executed concurrently or with partial concurrence. Further, in some embodiments, one or more of the blocks shown in FIGS. 6-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item tracking application 123, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. A non-transitory computer-readable medium embodying a program executable in a computing device, wherein, when executed, the program causes the computing device to:
   identify a selected region of a content page being rendered on a client device, the selected region being identified from the client device via a cursor highlighting a region of the content page;
   render, in response to the identification of the selected region of the content page, an approval user interface element in the content page alongside the selected region;
   obtain an approval indication corresponding to the approval user interface element, the approval indication further corresponding to an expression of interest in the selected region of the content page;
   identify an item of interest at least partly within the selected region of the content page associated with the approval user interface element based at least in part on identifying an item feature within the selected region and the item feature being used to identify the item of interest in an item repository, the item of interest being available in an electronic commerce system;
   identify a reputation score corresponding to a user of the client device, the reputation score associated with a historical ability of the user to identify a successful item in the item repository;
   adjust an item score corresponding to the item of interest, the item score representing a popularity level of the item, wherein the adjustment of the item score is based at least in part upon the reputation score of the user, the reputation score being based upon a historical ability of the user to identify at least one of: a popular product or a popular concept of interest;
   determine whether the item of interest satisfies a success measure based at least in part on a rate at which the item score has increased for a period of time relative to a respective item score for a plurality of other items;
   positively adjust the reputation score of the user when the item of interest meets the success measure; and
   negatively adjust the reputation score of the user when the item of interest fails to meet the success measure.

2. The non-transitory computer-readable medium of claim 1, wherein the approval indication is further associated with a feature of the item.

3. The non-transitory computer-readable medium of claim 1, wherein the success measure is further based at least upon at least one of: a sales volume of the item, a sales velocity of the item, or a profitability of the item.

4. The non-transitory computer-readable medium of claim 1, wherein the reputation score is based at least upon a timeliness measure associated with a plurality of approval indications associated with a respective plurality of success measures.

5. A system, comprising:
   at least one computing device;
   an item tracking application executable in the at least one computing device, wherein the item tracking application, when executed, causes the at least one computing device to at least:
      obtain a selected region of a content page being rendered on a client device, the selected region being identified from the client device via a cursor highlighting a region of the content page;
      obtain an approval indication corresponding to an approval user interface element associated with the selected region of the content page, the approval user interface element embedded in the content page, the approval indication further corresponding to an expression of interest in an item by a user;
      identify within the selected region the item associated with the approval user interface element based at least in part on identifying an item feature within the selected region and the item feature being used to identify the item in an item repository;
      identify a reputation score corresponding to the user, the reputation score associated with historical ability of the user to identify a successful product;
      adjust an item score corresponding to the item, the item score representing a popularity level of the item, wherein the adjustment of the item score is based at least upon the reputation score of the user;
      determine whether the item meets a success measure based at least in part on a rate at which the item score has increased for a period of time relative to a respective item score for a plurality of other items;
      positively adjust the reputation score of the user when the item meets the success measure; and
      negatively adjust the reputation score of the user when the item fails to meet the success measure.

6. The system of claim 5, wherein the approval indication is further associated with a feature of the item.

7. The system of claim 5, wherein the reputation score is based at least upon a historical rate of approval indications associated with a plurality of products meeting a respective plurality of success measures.

8. The system of claim 5, wherein the reputation score is based at least upon a timeliness measure associated with a plurality of approval indications associated with a respective plurality of success measures.

9. The system of claim 5, wherein the item tracking application further causes the at least one computing device to at least:
   analyze a text sample from a plurality of professional reviews of the item extracted from a trusted source to determine a sentiment of each review among the plurality of professional reviews, wherein a positive vote corresponding to the item is recorded when the sentiment is positive and a negative vote corresponding to the item is recorded when the sentiment is negative;
   positively adjust the reputation score of the user when the sentiment of one of the plurality of professional reviews is positive; and
   negatively adjust the reputation score of the user when the sentiment of one of the plurality of professional reviews is negative.

10. The system of claim 5, wherein the item tracking application further causes the at least one computing device to at least:
   identify a point in time associated with the approval indication; and
   positively adjust the reputation score of the user when the point in time occurs prior to a predefined threshold number of other users associated with a plurality of approval indications corresponding to the item.

11. The system of claim 5, wherein the at least one computing device comprises a first server, and wherein the approval indication and the selected region of the content page are obtained from a second server.

12. The system of claim 5, wherein identifying within the selected region the item associated with the approval user interface element further comprises identifying a product based at least in part on identifying a unique product identifier associated with the product within the selected region of the content page.

13. A method, comprising:
receiving, in at least one computing device, a selected region of a content page being rendered on a client device, the selected region being identified from the client device via a cursor highlighting a region of the content page;
generating, in the at least one computing device, an approval user interface element associated with the selected region of the content page, the approval user interface element embedded in the content page;
obtaining, in the at least one computing device, an indication of at least one user interaction with the approval user interface element in the content page by a user, the at least one user interaction being associated with an expression of interest in an item by the user;
identifying, in the at least one computing device, within the selected region the item associated with the approval user interface element based at least in part on identifying an item feature within the selected region and the item feature being used to identify the item in an item repository;
identifying, in the at least one computing device, a reputation score corresponding to the user, the reputation score associated with a historical ability of the user to identify a popular item;
adjusting, in the at least one computing device, an item score corresponding to the item, the item score representing a popularity level of the item, wherein the adjustment of the item score is based at least upon the reputation score of the user;
determining, in the at least one computing device, that the item meets a success measure based at least in part on a rate at which the item score has increased for a period of time relative to a respective item score for a plurality of other items; and
increasing, in the at least one computing device, the reputation score of the user.

14. The method of claim 13, wherein the item comprises at least one feature of the item available in an electronic commerce system, and identifying the item comprises identifying the at least one feature.

15. The method of claim 14, wherein identifying the at least one feature of the item is performed by a machine learning algorithm.

16. The method of claim 15, wherein the machine learning algorithm comprises a multiple instance learning algorithm configured to identify at least one feature of the item satisfying at least one indicator.

17. The method of claim 16, wherein the at least one indicator comprises an identity of at least one product available in an electronic commerce system.

18. The method of claim 13, wherein the reputation score is based at least in part upon a historical accuracy metric, the historical accuracy metric based upon a percentage of historical interactions of the user with a plurality of approval user interface elements that are associated with a popular item available via an electronic commerce system.

19. The method of claim 18, wherein the reputation score is further based at least in part upon the percentage of historical interactions of the user with the plurality of approval user interface elements occurring before the popular item achieves popularity.

20. The method of claim 13, further comprising:
determining, in the at least one computing device, when the item reaches a popularity threshold; and
positively adjusting, in the at least one computing device, the reputation score in response to the item reaching the popularity threshold in an electronic commerce system.

21. The method of claim 20, wherein determining when the item reaches a popularity threshold is based at least upon a sales velocity of the item in an electronic commerce system.

* * * * *